(12) United States Patent
Meier

(10) Patent No.: US 6,556,324 B1
(45) Date of Patent: Apr. 29, 2003

(54) DEVICE FOR CONTROLLING THE BEAM ALIGNMENT IN SATELLITE LASER COMMUNICATIONS SYSTEMS

(75) Inventor: Carsten Meier, Zurich (CH)

(73) Assignee: Oerlikon Contraves AG, Zurich (CH)

( * ) Notice: Subject to any disclaimer, the term of this patent is extended or adjusted under 35 U.S.C. 154(b) by 0 days.

(21) Appl. No.: 09/392,873

(22) Filed: Sep. 9, 1999

(30) Foreign Application Priority Data

Sep. 21, 1998 (CH) ...................................... 1998 1925/98

(51) Int. Cl.⁷ .............................................. H04B 10/00
(52) U.S. Cl. ...................... 359/159; 359/123; 359/124; 359/172
(58) Field of Search ................................ 359/159, 123, 359/124, 172

(56) References Cited

U.S. PATENT DOCUMENTS

| | | | |
|---|---|---|---|
| 4,577,282 A | | 3/1986 | Caudel et al. |
| 6,097,522 A | * | 8/2000 | Maerki et al. ............... 359/159 |
| 6,181,450 B1 | * | 1/2001 | Dishman et al. ............ 359/124 |
| 6,195,044 B1 | * | 2/2001 | Fowell ........................ 342/367 |
| 6,246,498 B1 | * | 6/2001 | Dishman et al. ............ 359/123 |
| 6,259,544 B1 | * | 7/2001 | Dishman et al. ............ 359/159 |
| 6,271,953 B1 | * | 8/2001 | Dishman et al. ............ 359/172 |

OTHER PUBLICATIONS

Ansari et al. *Charge–coupled device imaging system for precision beam steering in laser communications*. Optical Engineering. vol. 134, No. 11. pp. 3261–3281, Nov. 1995.

G. Baister et al. *Pointing acquisition and tracking for optical space communications*. Electronics and Communication Engineering Journal. vol. 8054. pp. 271–280, Dec. 1994.

Toni Tolker Nielsen. *Pointing, Acquisition and Tracking system for the Free Space Laser Communication System*, SILEX SPIE vol. 2381, pp. 194–205 Sep. 1995.

* cited by examiner

*Primary Examiner*—John Tweel
(74) *Attorney, Agent, or Firm*—Townsend and Townsend and Crew LLP; Guy W. Chambers

(57) ABSTRACT

A device for the control of the beam alignment in satellite laser communications systems has a digital signal processor (24), which has been inserted between an input interface (21) and an output interface (23), and to which a program memory (25) and a data memory (26) are separately connected, in which parameters are also stored, and which comprises sensors (171, 172, 173) and actuators (174, 175, 176) for aligning the laser beam with the counter station. The signal processor (24) contains an intermediate memory (240) for floating point and fixed point operations and further calculating units (241, 242, 243), as well as two access generators (244, 245). Highly flexible and very efficient control systems can be implemented by the employment of such a digital signal processor. By means of an adaptive control it is still possible to operate beam alignment systems at full performance levels, even after components have been degraded. The adjustment outlay for the optical components is drastically reduced because of auto-calibration.

21 Claims, 5 Drawing Sheets

DEVICE FOR CONTROLLING THE BEAM ALIGNMENT IN SATELLITE LASER COMMUNICATIONS SYSTEMS

TECHNICAL FIELD OF THE INVENTION

The invention relates to a device for controlling the beam alignment in satellite laser communications systems.

BACKGROUND OF THE INVENTION

In connection with optical beam alignment systems for communications or interferoimetric applications in satellites there is often the requirement for aligning a laser beam with high precision between a base station and a counter station. The accuracy required for this is a function of the distance between the two stations and the divergence of the laser beam. In satellite networks both parameters are mostly firmly prescribed by the constellation of the satellites and the maximum output available to the laser. Therefore the required accuracy of alignment is only possible by means of appropriately sensitive sensors/actuators in combination with an elaborate control concept.

This is made additionally more difficult by the extreme limiting conditions of space applications, which often result in accelerated wear of the components. However, in order to obtain the desired accuracy throughout the entire service life in spite of this, a concept for an adaptive control on the basis of a digital signal processing system is proposed in what follows. The control systems for beam alignment used up to now were not optimal because of the special limiting conditions which apply in connection with their use in satellites. Analog regulating systems are only suitable in a limited way because of their poor flexibility and the problems with the compensation of time-variant processes connected with this. Since more complex structures (for example higher order status controllers, predictors) can only be realized at great expense, and the achieved accuracy is limited, they are hardly usable for employment in highly accurate beam alignment systems.

Although digital regulating systems on the basis of microcomputers offer a high degree of accuracy and permit the realization of more complex structures, they are rather unsuitable for rapid dynamic processes because of their long calculating times. As a rule, the execution of mathematical operations (*,/exp. sin) typical for performing beam alignment in particular requires a lot of time, since most processes do not directly support floating point operations. These must mostly be taken over by the software, because of which often indefensibly long idle times result in a technical regulating system.

SUMMARY OF THE INVENTION

It is therefore the object of the invention to create a device for controlling the beam alignment in satellite laser communications systems, by means of which the disadvantages of the prior art are avoided.

A device for the control of the beam alignment in satellite laser communications systems has a digital signal processor, which has been inserted between an input interface and an output interface, and to which a program memory and a data memory are separately connected, in which parameters are also stored, and which comprises sensors and actuators for aligning the laser beam with the counter station. The signal processor contains an intermediate memory for floating point and fixed point operations and further calculating units, as well as two access generators. Highly flexible and very efficient control systems can be implemented by the employment of such a digital signal processor. By means of an adaptive control it is still possible to operate beam alignment systems at full performance levels, even after components have been degraded. The adjustment outlay for the optical components is drastically reduced because of autocalibration.

DESCRIPTION OF THE SPECIFIC EMBODIMENTS

Figure 1:
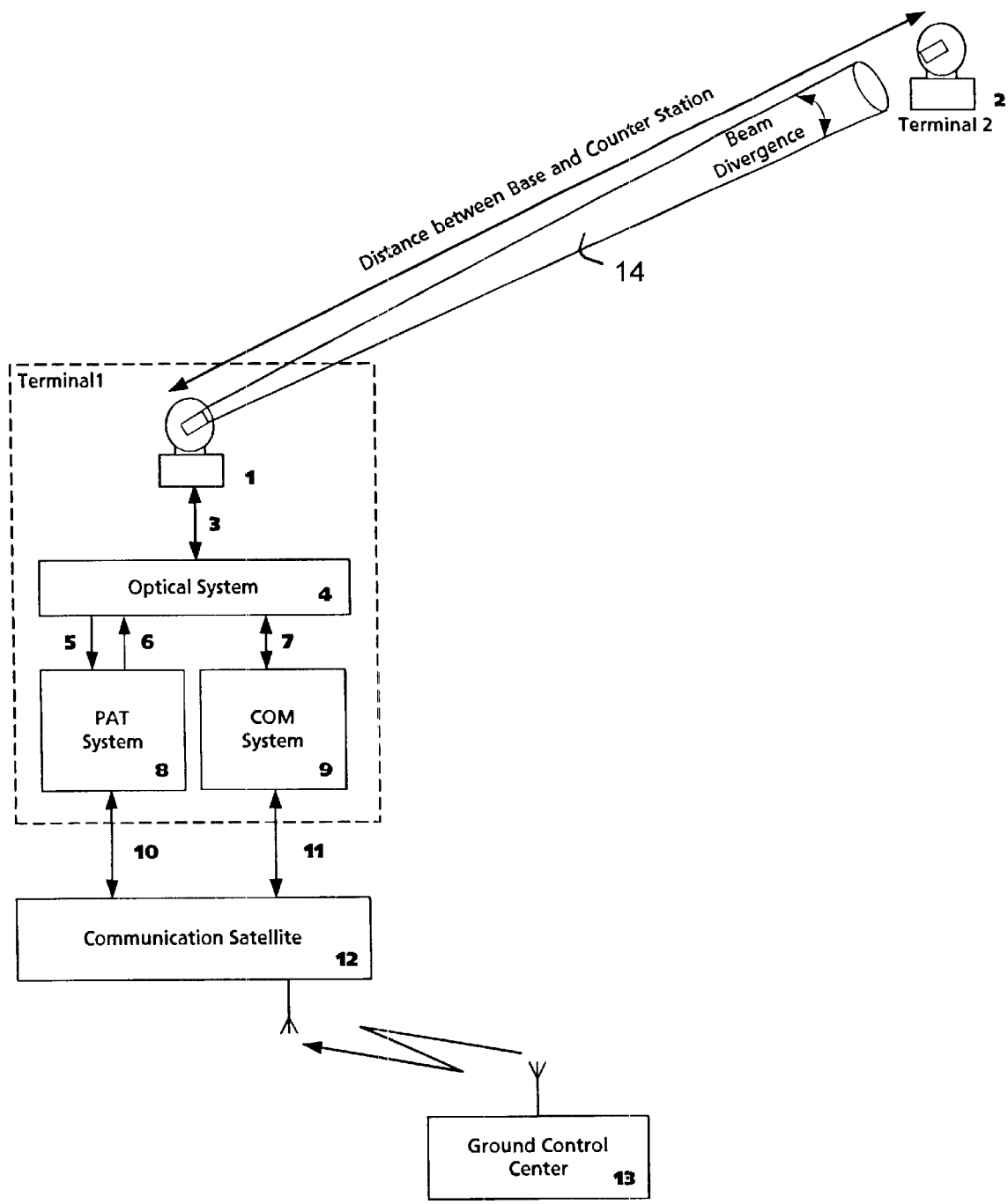
FIG. 1, a schematic configuration of a beam alignment system.

The beam alignment of two laser communications terminals which are at a distance from each other, namely between a first terminal 1 in a so-called base station and a second terminal 2 in a counter station, is represented in FIG. 1. Each one of these terminals 1 and 2 transmits a data-modulated laser beam 14 to the opposite station via a data terminal. Because of the beam divergence, the beam is greatly widened, so that only a fraction of the transmitted optical output is received at the respective opposite station. The received light is conducted via an optical link 3 to an optical system 4 and is detected there by means of sensors. The electrical signals obtained in this manner are on the one hand conducted to a communications system 9 via a hyper-frequency connection 7 for recovery of the data, on the other hand the sensors measure the angle of incidence of the received laser beam and forward this information via a first bus 5 to a beam alignment system 8 (PAT system). The beam alignment system 8 calculates the corrections for the beam to be sent out on the basis of this information and, via a second bus 6, sets the actuators in the optical system in such a way that the beam to be sent out intercepts the opposite station exactly. Since at the start of making the connection there is not yet an optical link between the terminals 1 and 2, the beam alignment system 8 receives the information regarding the position of terminal 2 from a communications satellite unit 12 via a data link 10. The communications system 9 is also connected with the unit 12 via a data link 11.

The arrangement in accordance with FIG. 1 functions as follows:

A command to establish an optical connection is transmitted from a ground control center 13 to the two satellites involved in a transmission. Thereupon the determination of its own position and course, as well as the position of the opposite satellite is performed in the on-board computer of each satellite. It is possible to form a vector, which is composed of two alignment angles (azimuth and elevation), for the alignment of the actuators from these values. These angles are set at the mirrors and mechanisms of the optical system and are continuously updated. This is necessary, because the two satellites are always moving in respect to each other. Simultaneously the sky is scanned by the sensors for detecting the laser beam of the counter station.

Once it has been detected, the alignment of the laser beam is changed in both satellites in such a way that it points exactly in the direction of the incoming laser beam from the opposite station. Now the two terminals have an optical link with each other which, in the further course of the build-up of the linkage, is continuously better adjusted into the center of the optical system, until coupling into a glass fiber becomes possible. Once this is accomplished, the laser frequencies are matched to each other and the system is ready to transmit data.

Because the satellites continuously move in respect to each other, the beam alignment system continuously endeavors to maintain the beam from the opposite station in the optical center and to align the outgoing beam with the opposite station with high precision. To this end it has several, preferably three, control circuits in order to meet the extreme demands made on the alignment.

The arrangement in accordance with FIG. 1, having the device 8 of the invention for controlling the beam alignment in satellite laser communications systems permits a highly accurate and dynamic alignment of a laser beam over large distances with the aim of transmitting a data flow, which is modulated on the laser beam, bidirectionally between two satellites.

The most important parameters of the beam alignment of such a system are: the distance between the terminals, the apex angle of the outgoing laser beam, the laser output and the accuracy of the beam alignment. In principle, these parameters are closely linked to each other so that, if one of these four parameters is changed, the other three have to be adapted for continued assurance of the dependable transmission of data. Since the first three values are predetermined by the arrangement of the satellites and/or the output characteristics and the structure of the components employed, they essentially cannot be randomly affected. However, through the invention it was learned that it is possible to affect the accuracy of the beam alignment by a more or less advanced regulating system.

Figure 2:
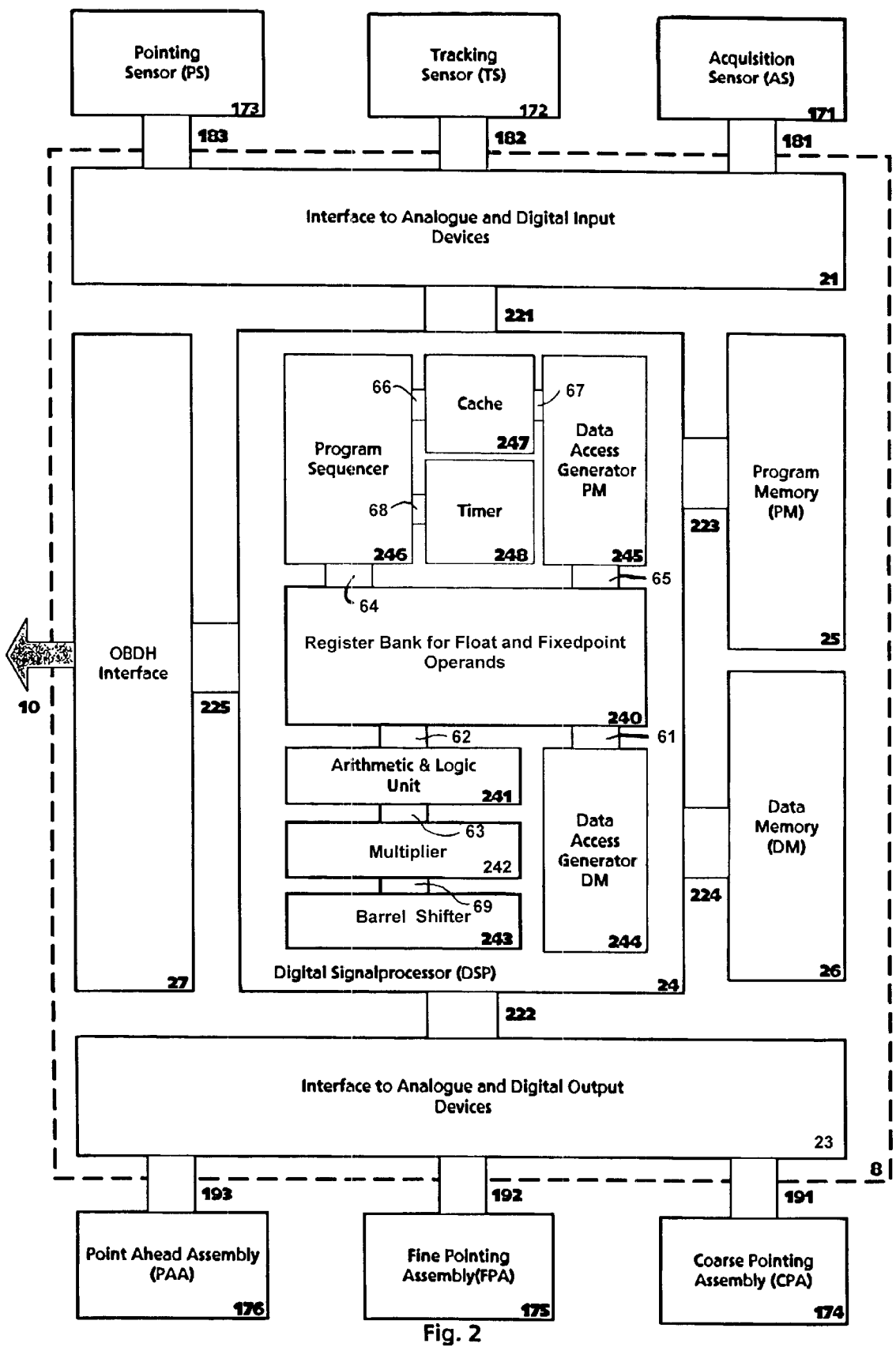
FIG. 2, the structure of a digital signal processing system.

The device of the invention for controlling the beam alignment in satellite laser communications system in accordance with FIG. 2 comprises a digital signal processor 24 (DSP), which-has been respectively inserted via one bus 221, or respectively 222, between an input interface 21 and an output interface 23 and to which a program memory 25 (PM) and a data memory 26 (DM) have respectively been separately connected via a bus 223, or respectively 224, wherein it is possible to store programs and parameters in these external memories 25 and 26. The interfaces 21 and 23 represent the interfaces between the analog/digital worlds. Sensors 171, 172, or respectively 173, which are components of the optical system 4 in FIG. 1, in which the buses 181, 182 and 183 have been together represented by the reference numeral 5, are connected to the interface 21 via buses 181, 182 and 183. Actuators 174, 175, or respectively 176, which are also components of the optical system 4 in FIG. 1, in which the buses 191, 192 and 193 are together represented by the reference numeral 6, are connected to the interface 23 via buses 191, 192 and 193. The alignment of the laser beam with the counter station is performed by means of the actuators. These could be, for example, electric motor drive mechanisms or piezoelectric tilt mirror elements. Within its internal structure, the digital signal processor 24 (FIG. 2) essentially contains an intermediate memory 240 for floating point and fixed point operations, to which an arithmetic/logical unit (ALU) 241, a multiplier 242 and a shift register (barrel shifter) 243, as well as a data access generator (DM) 244 for the data memory 26 are connected via buses 61, 62, 63, 64. Moreover, the digital signal processor 24 (DSP) comprises a data access generator (PM) for the program memory 25 and a control unit 246 (program sequencer), which are also connected to the intermediate memory 240 via buses 64, 65, 69. The random access generator 245 and the control unit 246 are connected to each other via buses 66, 67 and an ancillary command memory 247 (cache). Finally, the control unit 246 is also connected to a timer 258, also via a bus 68. The device 8 in accordance with FIG. 2 in addition comprises an OBDH (on board data handling) interface 27, which is connected via a bus 225 to the digital signal processor 24 and via a datalink 10 to the communications satellite unit 12 (FIG. 1).

The device for controlling the beam alignment in satellite laser communications systems in accordance with FIG. 2 functions as follows:

The beam alignment system operates in accordance with a three-stage concept with underlying further stages. The three main stages are called pointing, acquisition and tracking, from which the acronym of such PAT systems is derived. Each stage characterizes a defined phase of the link build-up and the data transmission.

The first phase (pointing) occurs after the satellites have received the command for establishing the link from the ground control center. It is distinguished in that the terminals align their actuators with the counter station and search for the laser beam of the counter station with their sensors. At this time both terminals do not yet have an optical link with each other. This phase is also called "open loop pointing", since the alignment here is exclusively based on the values derived from an orbit model. In a technical regulation sense this is purely a controlling operation.

Once the sensors have detected the laser beam from the counter station, this becomes the acquisition phase, in which a step-by-step improvement of the beam alignment, the coupling of the beam into a glass fiber and the tuning of the lasers takes place. Here, beam alignment no longer is based on calculated values, but is based on the measured deviations of the beam, which is incoming from the counter station, from the optical center of the system. Now the controllers are operated with the goal of minimizing these deviations continuously. Once this deviation is compensated, the outgoing laser beam is then exactly aligned with the opposite satellite, since both the incoming laser beam from the counter station and the outgoing laser beam run through the same optical system. Every change of the incoming beam toward the optical center simultaneously causes an improvement of the alignment of the outgoing beam. In this sense this is a regulation operation here.

Following the acquisition phase, the system is ready for data transmission. During this time the beam alignment system has the task of maintaining the linkage in spite of the movement of the two satellites in relation to each other. This work stage is called the tracking phase. This is the main work phase of the system. Most satellite networks are designed by means of the arrangement of their satellites in such a way, that in the ideal case it is only necessary to establish the link once after the start. During the further course the links are continuously maintained and a re-acquisition is not necessary. Each one of these work stages also consists of a series of further sub-stages and phases, which do not directly affect the present invention.

Such a method is excellently executed with the aid of the device for controlling the beam alignment in satellite laser communications systems in accordance with FIG. 2, which represents the interior circuitry of the digital signal processor (DSP) as a physical block circuit diagram. The operands for the calculations are stored in the intermediate memory 240. Both floating point and fixed point numbers can be stored here. The processor 24 has three specialized calculating units, which can operate chronologically in parallel. Linear mathematical operations, such as addition and subtraction, as well as logical linkages, such as AND and OR, are performed in the unit 241 (ALU). The multiplier 242 performs floating point or fixed point multiplications in a single cycle. The shift register 243 can perform right and left shifts, as well as the rotation of operands. Very complex algorithms can be realized at large bandwidths by means of these basic operations, which are performed at very high speeds (up to 120 million per second).

Since the internal intermediate memory 240 of the processor 24 has only a shallow memory depth, the system has the external memories 25 and 26, which can be accessed by means of the access generators 244 and 245. Because the processor operates in two separate memory areas, which can be accessed chronologically in parallel, the two operands required for an operation can be read, linked and the result stored in the intermediate memory 240 in a single processing step.

The control unit 246, together with the ancillary command memory 247 (cache), control the internal processes in the processor 24. Here, the control unit obtains the instructions for the program memory stored in the access generator 245, translates them into a format which the processor 24 can understand and controls the interior processes in such a way that the command is performed chronologically, locally and functionally correct. The ancillary command memory 246 has the task to store frequently used instructions on an intermediate basis. This has the advantage that the commands need not be loaded again and again out of the slower program memory.

It is therefore possible by means of the employment of such a digital signal processor to combine the advantages of analog and digital regulating systems and to achieve a solution which is optimal for the special requirements in the field of space travel. Based on their special computing structure, these systems have the ability of performing parallel operations, and thereby make very short signal processing times, i.e. large controller bandwidths, possible. Because of the separation of programs and data memories (Harvard architecture) it is possible in the course of one processing step to load two operands simultaneously, to link them and to store the result.

This digital signal processor can directly support work with floating point numbers, and in this way make time-consuming conversion algorithms superfluous. Moreover, the arithmetic calculating units of most digital signal processors make possible direct floating point multiplication, floating point addition and fixed point division in one processing step. A highly efficient execution of the algorithms typical for beam alignment systems, such as coordinate transformations or signal filtering, is achieved by this.

Figure 3:
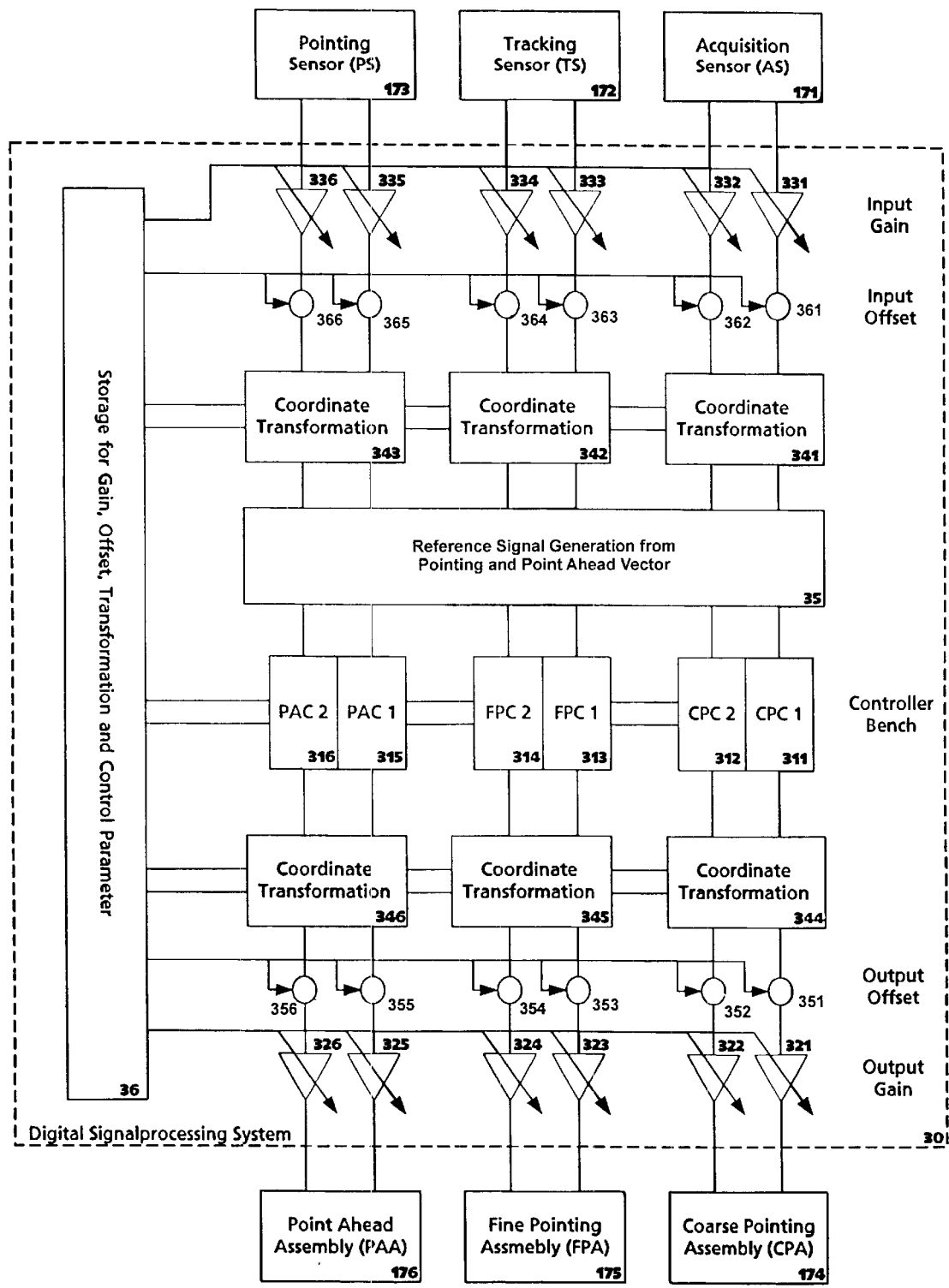
FIG. 3, an adaptive regulating system for optical beam alignment.

FIG. 3 shows the functional structure of the device of the invention for controlling the beam alignment in satellite laser communications systems in accordance with FIG. 2, but it represents a sort of replacement circuit of the former. This device comprises a digital signal processor 30 operating as a controller, which therefore represents the functional block circuit diagram of an adaptive multivariable controller, such as is implemented on the digital signal processor 24 represented in FIG. 2. The deflection of the beam is performed by three actuators 174, 175, 176 for coarse alignment, fine alignment and angular point-ahead. The coarse pointing assembly 174 (CPA) is intended for coarse alignment and represents a two-axis alignment mechanism, which can deflect the laser beam over a large angular range with small bandwidth. The fine pointing assembly 175 (FPA) is provided for fine pointing and it represents a two-axis tilt mirror for a beam deflection over a narrow angular range with a large bandwidth. The point-ahead assembly 176 (PAA) is intended for angular pointing, which comprises a two-axis pointing mirror for compensating the beam travel time between the base and counter stations.

These three actuators are controlled by means of digital regulation algorithms, which are implemented on the signal processor and which are freely programmable as to their structure, as well as their parameters. They therefore comprise three controllers: a coarse pointing controller 311, 312 (CPC), a fine pointing controller 313, 314 (FPC) and a point-ahead controller 315, 316 (PAC).

The controllers 311/312, 313/314 and 315/316 are each twice provided, because each sensor and each actuator operates in two axes. Each sensor provides two signals x, y, which indicate the deviation of the received laser beam from the optical center of the system. Following pre-processing regarding gain, offset coordinate transformation and control parameters, the signals are forwarded to the controllers 311 . . . 316 (controller bench). A regulating algorithm is provided here for each axis, i.e. for example the controller 311 (CPC1) for the x-axis and the controller 312 (CPC2) for the y-axis. Following post-processing, the calculated manipulated variables are sent to the alignment mechanisms, which deflect the beam to be transmitted in two axes x, y and transmit it to the counter station in this way.

The CPC controller 311, 312 controls the actuator 174 for the rough pointing of the laser beam and takes over the beam tracking during a movement of the two stations relative to each other. The FPC controller 313, 314 controls the FPA actuator 175 at a high dynamic ratio for the compensation of the satellite vibrations and in this way maintains the laser beam in the optical center of the system. By means of the PAA actuator 176, the PAC controller 315, 316 compensates the beam travel time which, because of large distances, is not inconsiderable.

The optical sensors located in the optical system 4 of the arrangement in accordance with FIG. 1 for receiving the beam from the counter station and for controlling the accuracy of its own beam alignment are represented in FIG. 3, namely the acquisition sensor 171, the tracking sensor 172 and the point-ahead sensor 173, which differ in their sight range and their bandwidth. The laser light of the counter station is detected by the sensors 171 and 172. Each sensor measures, with different accuracy and band-width, the beam offset of the received light in respect to the optical center. The detected deviation is provided as Delta x, or respectively Delta y to the DSP system. The sensor 171 (acquisition sensor AS) is a wide angle sensor of narrow bandwith for finding the counter station. The tracking sensor (TS) is a high-resolution precision sensor of great bandwidth for tracking the beam. The point-ahead sensor 173 (PS) is a sensor for controlling the own beam alignment.

As represented in FIG. 3, an offset stage 351 to 356 and an amplifier stage 321, 322, or respectively 323, 324, or respectively 325, 326 are connected upstream of each actuator 174, 175, 176, and an offset stage 361 to 366 and an amplifier stage 331, 332, or respectively 333, 334, or respectively 335, 336 are connected downstream of each sensor 171, 172, 173. In the simplest case this is only a factor by which the read-in measured value, or respectively issued set point is weighted.

Figure 4:
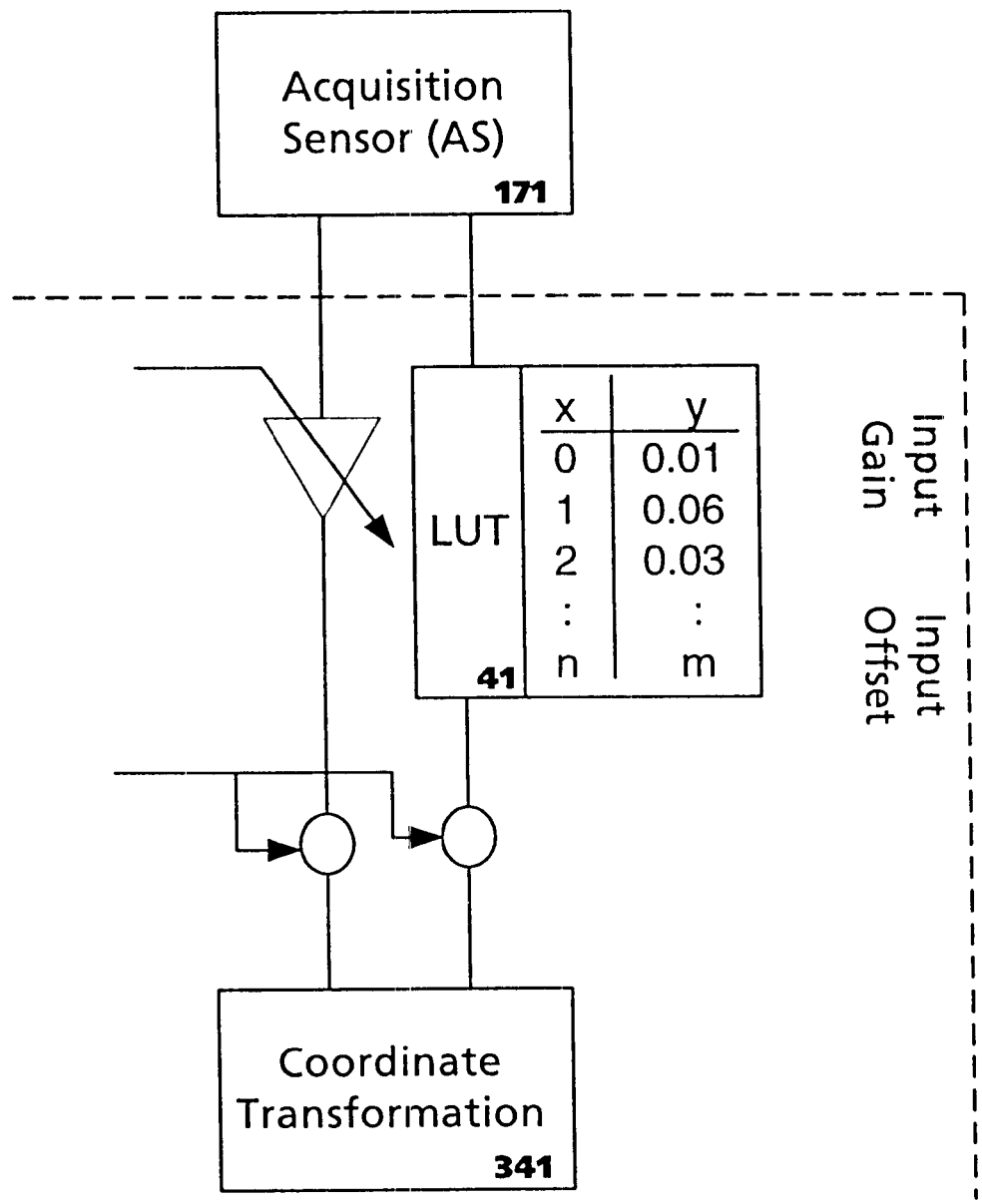
FIG. 4, a distortion corrector for steady state sensor characteristics by means of a look-up table (LUT), and FIG. 5, the correction of the coordinate system coupling of an optical sensor.

In a non-time-variant system these factors are constant and are determined by the ascending gradient of the sensor/actuator characteristic curve. However, in space applications the components can become considerably degraded over their lifetime because of the extreme conditions of their surroundings. Therefore every amplifier is designed to be variable and can be reset if needed by means of suitable calibration methods. Because of this method even the use of non-linear components becomes possible in that the respective amplifier block is replaced by a "look-up" table 41 (LUT circuit) (FIG. 4). Therefore, in connection with an adaptive controller of the variation represented in FIG. 4, not only can the parameters be freely programmed, but it is also possible to change the structure of the controller. The result of this is that very complex structures can be generated by means of such digital signal processing systems, which would be unthinkable for conventional analog systems.

This distortion correction of the characteristics curve can also be performed later, in particular also after the start of the satellite, since the structure of the control system can be changed at any time.

To compensate inaccuracies of adjustment, there is the possibility of an offset compensation downstream of each sensor and upstream of each actuator. It is also programmable and can be used during the service life to compensate degradations. Transformation matrices 341, 342, 343, or respectively 344, 345, 346 are arranged respectively upstream and downstream of the controller blocks 311 to 316 for correcting the imaging conditions and also for correcting inaccuracies in adjustment. These initially correct imaging conditions which change as a result of the movement of the mechanisms. However, they can also be used for the compensation of cross-, or respectively overcoupling resulting from installation tolerances.

Figure 5A:
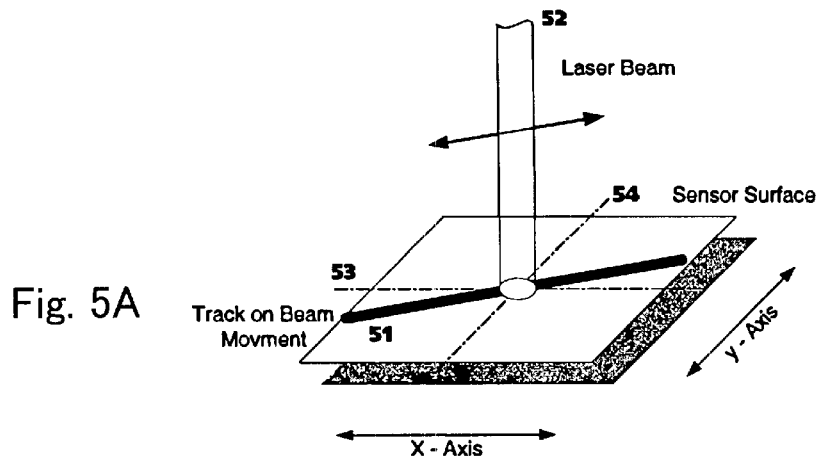
Figure 5B:
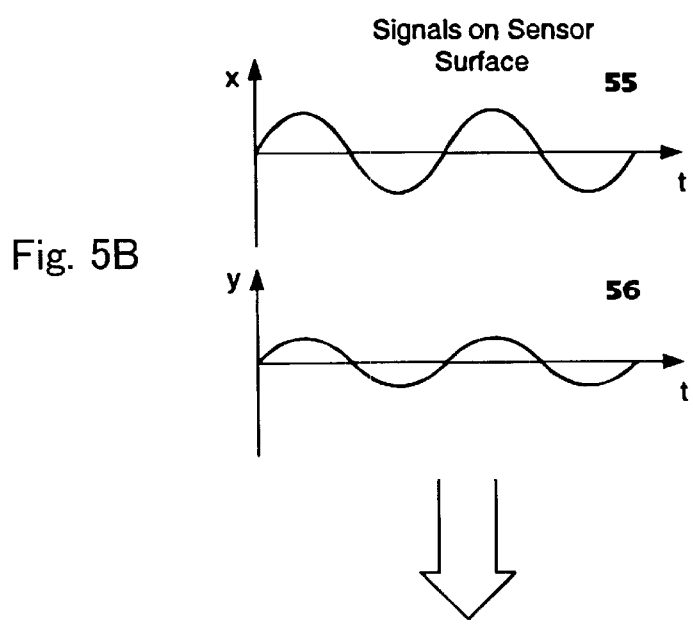
Figure 5C:
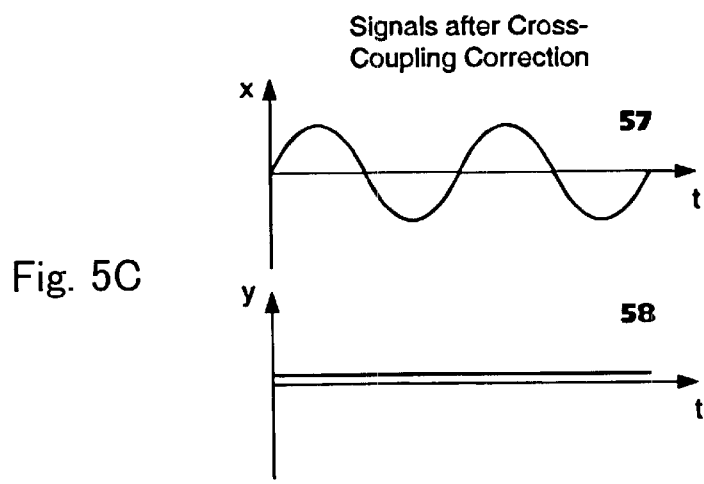

FIG. 5 is used to explain the advantages of the parameterizable coordinate transformations in accordance with FIG. 3. It shows what effects a sensor, which was not optimally adjusted, has on the output signal. By way of example, the track 51 of an oscillating laser beam 52, which does not exactly agree with the coordinate axes x, y of the sensor, and the resultant sensor signals 55 and 56 are represented in FIG. 5. It can be seen that a movement of the beam was detected on both axes, although the beam is only being deflected in one direction. This is the result of the twisting of the sensor 53, 54 in respect to the direction of movement of the laser beam. These effects can be removed by means of a suitable coordinate transformation, and corrected signals 57 and 58 can be obtained. Here it was found by means of the invention that even more complex degradation effects, such as occur for example because of the aging of optical or opto-mechanical elements, can be compensated by means of adaptive control.

Moreover, the opportunity arises from this of reducing the adjustment outlay, which is very large with optical systems during production, to a minimum. In combination with the offset and amplification parameters, a very simple calibration possibility for the entire beam alignment system results in this way. While up to now it has been necessary to adjust every optical component highly accurately in all six degrees of freedom (3×position, 3×course), a simple adjustment to production tolerances is sufficient now.

The precise alignment of the system is taken over by a suitable algorithm, which surveys the sensors and actuators by means of a coupled-in beam and sets the parameters accordingly. This process can even be performed in orbit after the start of the system. If no suitable laser beam is available, the calibrating information can also be obtained by tracking a natural celestial body.

The controller bench 311 to 316 in FIG. 3 contains the individual controllers of the beam alignment system which, because of the good performance of the signal processor, can also be very complex. The design of the control algorithms can be performed in the conventional manner with traditional controllers, such as PID (proportional, integral, differential) controllers or status controllers in a continuous operation and can later be transformed into the time-discrete area. However, the advantages of the digital controller design (deadbeat etc.) can be fully utilized in addition.

A reference signal arrangement 35 is represented in the equivalent circuit diagram, which generates the reference signals required for control from the pointing vector and the point-ahead vector of the satellite.

In "open loop pointing", the alignment of the mechanisms and mirrors of the actuators 174 to 176 takes place on this basis. Once the optical link between the two terminals has been established, the beam alignment takes place on the basis of the beam deviation measured by the sensors 171 to 173. For this purpose the reference signal arrangement 35 receives the corrected sensor signals from the coordinate transformation blocks 341 to 343 and distributes them to the appropriate controllers 311 to 316. This distribution is required since, depending on the work stage, different sensors are used for the control. For example, the control of the actuators for fine pointing 175 and coarse pointing 176 during the communications phase takes place exclusively on the basis of the measured data from the tracking sensor 172.

The function block 36 is responsible for storing the variable parameters, in particular for amplification, offset, transformation and control. As explained, this is an adaptive control concept which means that preferably all parameters must be freely programmable. This is achieved in that all values which are relevant for control (controller amplification, offsets, proportional, integral, differential portions) are not "hardwired", but instead can be changed at any time by overwriting the values in the memory. For this reason this function block is connected with all variable function blocks and supplies the amplifier blocks 331 to 336, as well as 321 to 326, the offset compensations, the coordinate transformation blocks 341 to 346 and the controllers with data.

FIG. 4 shows that not only the parameters can be changed, but that the structure of the controllers can also be adapted. The characteristic curve distortion correction of a sensor by means of the look-up table 41 is cited as an example of this.

Assuming that during the service life of a laser communications terminal (approximately 10 years) an optical sensor is changed over the years by the effects of heat and cold, cosmic radiation, vacuum, or the like in such a way that its initially linear characteristic curve becomes increasingly distorted and non-linear, in conventional systems this would mean the outage of the terminal and a satellite no longer capable of communicating.

In contrast to this, with an adaptive control, wherein the parameters as well as the structure can be changed later, the system continues to remain capable of functioning. All that is necessary is to perform an update of the signal processor software, and the structure of the controller can be adapted in such a way that for example the characteristic curve of the affected sensor is again linearized.

The device in accordance with the present invention can operate together with arrangements, known per se, for beam alignment and compensation of the beam travel time by means of point-ahead angles, since they are of only subordinate importance for the principle of adaptive control by means of digital signal processing systems in accordance with the present invention.

The exemplary embodiments represented above should be merely understood as an explanation of the application of such a system. Other embodiments immediately arising therefrom for one skilled in the art also contain the basic concept of the invention. The present invention relates in particular to a device for the control and/or regulation of the laser beam alignment in satellite laser communications systems with a digital signal processing system in the different variations described.

What is claimed is:

1. An electronic device contained in a satellite to control and regulate laser beam alignment in satellite laser communications comprising:
   a digital signal processor;
   an on board data handling interface connected to both said digital signal processor and a communications satellite unit;
   a plurality of sensors which input coarse and fine beam detection data into said digital signal processor;
   a plurality of alignment actuators which receive directions from said digital signal processor; and
   a plurality of programmable amplifiers within said digital signal processor.

2. The electronic device in accordance with claim 1 further comprising a programmable offset compensator within said digital signal processor.

3. The electronic device in accordance with claim 1 wherein said digital signal processor further includes a programmable transformation matrix.

4. The electronic device in accordance with claim 1 wherein said digital signal processor further includes an adaptive control system for beam alignment.

5. The electronic device in accordance with claim 1 further comprising memory associated with said digital signal processor which stores control algorithms for implementing coarse and fine controls.

6. The electronic device in accordance with claim 4 wherein the data used for adaptive control is stored in a memory associated with said digital signal processor.

7. The electronic device in accordance with claim 1 further comprising:
   an analog-to-digital input interface between said sensors and said digital signal processor; and,
   a digital-to-analog output interface between said digital signal processor and said actuators.

8. An electronic device contained in a satellite to control and regulate of laser beam alignment in satellite laser communications comprising:
   a digital signal processor including an arithmetic logic unit, a multiplier, a shift register, a data access generator and an intermediate memory for floating point and fixed point operations;
   an on board data handling interface connected to both said digital signal processor and to a communications satellite unit;
   a plurality of sensors which input coarse and fine beam detection data into said digital signal processor;
   a plurality of alignment actuators which receive directions from said digital signal processor;
   a program memory connected to said digital signal processor; and,
   a data memory connected to said digital signal processor.

9. The electronic device in accordance with claim 8 wherein said plurality of sensors includes a pointing sensor, a tracking sensor and an acquisition sensor.

10. The electronic device in accordance with claim 8 wherein said plurality of actuators includes a coarse pointing assembly actuator, a fine pointing assembly actuator and a point ahead assembly actuator.

11. The electronic device in accordance with claim 10 wherein signals are supplied to said coarse pointing assembly actuator by said digital signal processor through a two axis alignment mechanism.

12. The electronic device in accordance with claim 10 wherein signals are supplied to said fine pointing assembly actuator by said digital signal processor through a two axis tilt mirror mechanism.

13. The electronic device in accordance with claim 10 wherein signals are supplied to said point ahead assembly actuator by said digital signal processor through a two axis point-ahead mirror mechanism.

14. The electronic device in accordance with claim 10 wherein said actuators are controlled by digital control algorithms implemented by said digital signal processor.

15. The electronic device in accordance with claim 14 wherein said digital control algorithms and the data used for them are programmable.

16. The electronic device in accordance with claim 10 further comprising at least two controllers in said digital signal processor for each of said coarse pointing assembly actuator, fine pointing assembly actuator and point ahead assembly actuator.

17. The electronic device in accordance with claim 8 further comprising a plurality of programmable transformation matrices in said digital signal processor which receive data from said sensors.

18. The electronic device in accordance with claim 17 further comprising a look-up table circuit inserted between at least one of said programmable transformation matrices and said sensors.

19. The electronic device in accordance with claim 8 further comprising a plurality of programmable transformation matrices in said digital signal processor which provide directions to said actuators.

20. The electronic device in accordance with claim 19 further comprising a look-up table circuit inserted between at least one of said programmable transformation matrices and said actuators.

21. The electronic device in accordance with claim 8 further comprising a plurality of programmable amplifiers, programmable offset compensators and programmable transformation matrices within said digital signal processor.

* * * * *

UNITED STATES PATENT AND TRADEMARK OFFICE
CERTIFICATE OF CORRECTION

PATENT NO. : 6,556,324 B1
DATED : April 29, 2003
INVENTOR(S) : Carsten Meier

It is certified that error appears in the above-identified patent and that said Letters Patent is hereby corrected as shown below:

<u>Title page,</u>
Item [73], Assignee, should read as follows:
-- [73] Assignee: Contraves Space AG --

Signed and Sealed this

Thirtieth Day of March, 2004

JON W. DUDAS
*Acting Director of the United States Patent and Trademark Office*